UNITED STATES PATENT OFFICE.

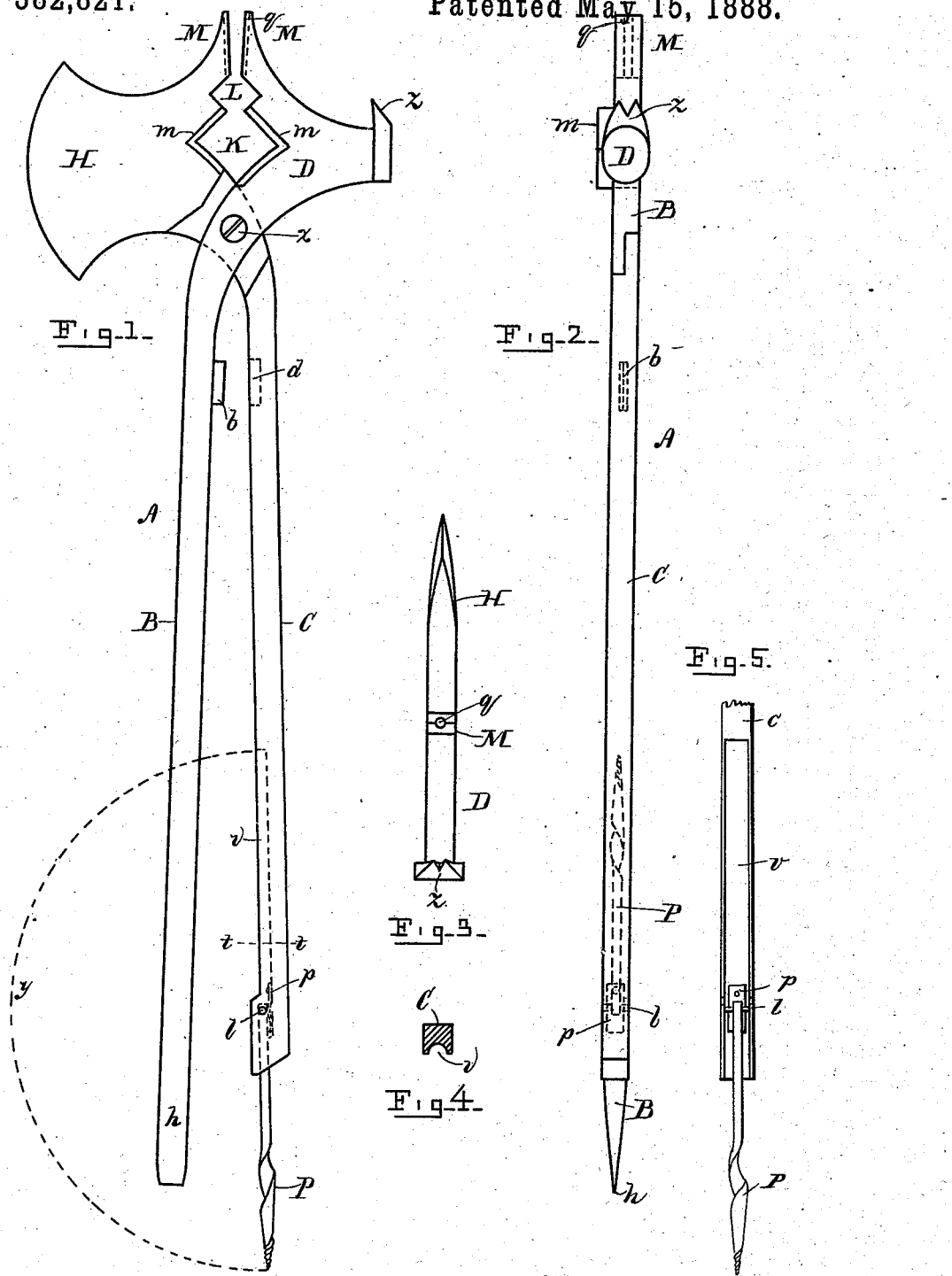

JOSEPH D. MARSTERS, OF BOSTON, MASSACHUSETTS.

COMBINATION-TOOL.

SPECIFICATION forming part of Letters Patent No. 382,821, dated May 15, 1888.

Application filed September 8, 1887. Serial No. 249,075. (No model.)

*To all whom it may concern:*

Be it known that I, JOSEPH D. MARSTERS, of Boston, in the county of Suffolk, State of Massachusetts, have invented certain new and useful Improvements in Combination-Tools, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved combination-tool; Fig. 2, an edge elevation of the same as viewed from the right in Fig. 1; Fig. 3, an end elevation, and Fig. 4, a horizontal section, taken on the line $t\ t$ in Fig. 1. Fig. 5 is an elevation of the inner face of a portion of one of the handles provided with a gimlet.

Like letters of reference indicate corresponding parts in the different figures of the drawings.

My invention relates to that class of tools in which several well-known mechanical implements are combined; and it consists in a novel construction and arrangement of parts, as hereinafter more fully set forth and claimed, the object being to produce a more effective article of this description than is now in ordinary use.

The nature and operation of the improvement will be readily understood by all conversant with such matters from the following explanation.

In the drawings, B C represent the handles, which cross each other and are pivoted together at $x$, after the manner of the handles in a pair of pipe-tongs, pliers, and other similar implements.

The handle C is provided at its shorter end with a hatchet-blade, H, and the handle B with a hammer-head, D, having a claw, $z$, for extracting nails, projecting from its poll. The inner or adjacent edges of the hammer and hatchet are provided with corresponding recesses, so that when brought together square openings K L of different sizes will be formed, thereby adapting the implement for use as a wrench. Around the opening K is disposed an outwardly-projecting flange, $m$, thus enabling the implement to serve the purpose of a monkey-wrench.

A projection, M, is formed on the outer edge of the blade H, adjacent to the opening L, and there is also a corresponding projection, M, on the head D, said projections constituting the jaws of pliers, and being grooved on their faces, as shown at $q$, to enable them to properly grasp a piece of wire or similar article.

On the inner side of the handle B, below the joint $x$, is affixed a longitudinally-arranged blade, $b$, adapted to enter a corresponding slot, $d$, in the handle C, the purpose of said blade being to serve as a wire-cutter.

The lower end of the handle B is flattened at $h$, as shown in Fig. 2, to serve as a screw-driver.

The handle C is somewhat shorter than the handle B, and is grooved longitudinally on its inner side, as shown at $v$, a gimlet, P, being pivoted thereto at $l$ in such a manner that when not in use it may be folded down into the groove, and thereby concealed in said handle, as shown in Fig. 2, being retained in position when either extended or folded by a spring, $p$, which is secured in the groove under the pivot $l$.

When it is desired to use the gimlet, it is extended by turning it on its pivot $l$, as shown by the dotted line $r$ in Fig. 1, and held in position by the spring $p$ and by closing the handles B C, thereby causing it to be clamped between them.

Having thus explained my invention, what I claim is—

1. The improved combination-tool herein described, the same consisting of the handle B, provided with the blade $b$, the head D, claw $z$ on said head, the projection M, the recesses in the lower side of said head, and flange $m$, adjacent to said recesses, in combination with the handle C, pivoted at $x$ to the handle B, provided with the hatchet-blade H, the recesses at the top of said blade, the flange $m$ adjacent to the said recesses, the slot $d$, the projection M, and the gimlet P, pivoted in the lower end of said handle, substantially as described.

2. In a tool of the character described, the handle C, grooved longitudinally on its inner side and provided with the pivoted gimlet P, adapted to be folded into said groove, in combination with the handle B, pivoted to the handle C, and adapted to assist in keeping said gimlet properly extended when said handles are closed, substantially as set forth.

JOSEPH D. MARSTERS.

Witnesses:
O. M. SHAW,
E. J. JORDAN.